United States Patent
Li et al.

(10) Patent No.: US 12,309,217 B2
(45) Date of Patent: May 20, 2025

(54) SYSTEM AND METHOD FOR PLAYLIST GENERATION

(71) Applicant: 17LIVE Japan Inc., Tokyo (JP)

(72) Inventors: Kun-Ze Li, Taipei (TW); Che-Wei Liu, Taipei (TW); You-Chang Lin, Taipei (TW)

(73) Assignee: 17LIVE Japan Inc., Tokyo (JP)

( * ) Notice: Subject to any disclaimer, the term of this patent is extended or adjusted under 35 U.S.C. 154(b) by 0 days.

(21) Appl. No.: 18/469,334

(22) Filed: Sep. 18, 2023

(65) Prior Publication Data
US 2024/0380804 A1    Nov. 14, 2024

(51) Int. Cl.
*H04L 65/61* (2022.01)
(52) U.S. Cl.
CPC .................... *H04L 65/61* (2022.05)
(58) Field of Classification Search
CPC ..... H04L 65/61; H04L 9/3297; H04L 43/106; H04L 67/108; H04N 21/4622
See application file for complete search history.

(56) References Cited

U.S. PATENT DOCUMENTS

| | | | | |
|---|---|---|---|---|
| 2005/0131831 | A1* | 6/2005 | Fieldson | G06F 21/10 705/59 |
| 2009/0288127 | A1* | 11/2009 | Corson | H04N 21/4788 725/110 |
| 2016/0057317 | A1* | 2/2016 | Zhao | H04N 21/8358 348/515 |
| 2017/0006314 | A1* | 1/2017 | Danovitz | H04L 65/762 |
| 2017/0195744 | A1* | 7/2017 | Engel | H04L 65/60 |
| 2021/0058459 | A1* | 2/2021 | Faibish | H04L 67/133 |
| 2022/0256214 | A1* | 8/2022 | Smith | H04N 21/23439 |
| 2022/0353675 | A1* | 11/2022 | Zhu | H04L 9/14 |

FOREIGN PATENT DOCUMENTS

TW    201445986 A    12/2014

OTHER PUBLICATIONS

Notice of Reasons for Refusal dated Aug. 29, 2023, issued in corresponding Japanese Patent Application No. 2023-076940 with English translation (4 pgs.).

* cited by examiner

*Primary Examiner* — Schquita D Goodwin
*Assistant Examiner* — Linh T. Nguyen
(74) *Attorney, Agent, or Firm* — Chun-Ming Shih; HDLS IPR SERVICES

(57) ABSTRACT

The present disclosure relates to a system and a method for playlist generation. The method includes: obtaining a first stream portion information and a unique key from a first streaming server; determining a first set of stream portions stored on a space of a cloud server to be consistent with the first stream portion information, the space being addressable by the unique key; generating a playlist file according to the first stream portion information; obtaining a second stream portion information and the unique key from a second streaming server; determining a second set of stream portions stored on the space of the cloud server to be consistent with the second stream portion information; and updating the playlist file according to the second stream portion information.

9 Claims, 13 Drawing Sheets

Stream DB 310

| Stream ID | Distributor ID | Viewer ID |
|---|---|---|
| ST22 | 001A | SS5, SS12, SS43 |
| ST92 | 002B | TT3, TS2 |
| ... | ... | ... |

FIG. 4

UserDB 312

| UserID | Points |
|--------|--------|
| 001A   | 3243   |
| 002B   | 2510   |
| SS5    | 1803   |
| ...    | ...    |

FIG. 5

Gift DB 314

| Gift ID | Awarded points | Price points |
|---------|----------------|--------------|
| TT01 | 90 | 100 |
| TE01 | 180 | 200 |
| WTS10 | 40 | 50 |
| ... | ... | ... |

FIG. 6

SYSTEM AND METHOD FOR PLAYLIST GENERATION

CROSS-REFERENCE TO RELATED APPLICATIONS

This application is based on and claims the benefit of priority from Japanese Patent Application Serial No. 2023-076940 (filed on May 8, 2023), the contents of which are hereby incorporated by reference in its entirety.

TECHNICAL FIELD

The present disclosure relates to playlist generation in the streaming field.

BACKGROUND

Real time interaction on the Internet, such as live streaming service, has become popular in our daily life. There are various platforms or providers providing the service of live streaming, and the competition is fierce. It is important for a platform to provide to its users their desired services.

Taiwan patent application publication TW201445986A discloses a playlist server for accessing video data.

SUMMARY

A method according to one embodiment of the present disclosure is a method for playlist generation being executed by one or a plurality of computers, and includes: obtaining a first stream portion information and a unique key from a first streaming server; determining a first set of stream portions stored on a space of a cloud server to be consistent with the first stream portion information, the space being addressable by the unique key; generating a playlist file according to the first stream portion information; obtaining a second stream portion information and the unique key from a second streaming server; determining a second set of stream portions stored on the space of the cloud server to be consistent with the second stream portion information; and updating the playlist file according to the second stream portion information.

A system according to one embodiment of the present disclosure is a system for playlist generation that includes one or a plurality of processors, and the one or plurality of computer processors execute a machine-readable instruction to perform: obtaining a first stream portion information and a unique key from a first streaming server, determining a first set of stream portions stored on a space of a cloud server to be consistent with the first stream portion information, the space being addressable by the unique key; generating a playlist file according to the first stream portion information; obtaining a second stream portion information and the unique key from a second streaming server; determining a second set of stream portions stored on the space of the cloud server to be consistent with the second stream portion information; and updating the playlist file according to the second stream portion information.

A system according to one embodiment of the present disclosure includes a streaming server and a playlist generator. The streaming server is configured to: receive a stream segment; generate a unique key according to a distributor ID and a stream ID of the stream segment; generate stream portions from the stream segment; attach timestamps to the stream portions; transmit the stream portions and the unique key to a cloud space on a cloud server; and transmit a count of the stream portions, the timestamps, and the unique key to the playlist generator. The playlist generator is configured to: identify the cloud space on the cloud server with the unique key; determines a stream portion consistency between the streaming server and the cloud space; and generate a playlist file according to the count of the stream portions and the timestamps.

BRIEF DESCRIPTION OF THE DRAWINGS

FIG. 4 is a data structure diagram of an example of the stream DB 310 of FIG. 3.

FIG. 5 is a data structure diagram showing an example of the user DB 312 of FIG. 3.

FIG. 6 is a data structure diagram showing an example of the gift DB 314 of FIG. 3.

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

In a streaming system (or archive system) according to a related art which the inventors generate by their own for the purpose of comparison with the present disclosure, when a distributor (or a streamer) suffers an unstable (or intermittent) internet connection, the stream he or she performs is broken into separate segments. Or, when a distributor jumps to a group call stream (or accepts a group call stream invitation) during the distributor's own stream, the stream segment before the group call and the stream segment after the group call will be cut into separate segments.

The different segments cannot be integrated into a complete stream in the correct order. A playback file or a playlist file for the complete stream cannot be generated from the separate segments. Different segments are transmitted from the distributor to different streaming servers. Different segments are transmitted from respective streaming servers to be stored in different spaces (or different files) in a cloud server. The upload of each segment to the corresponding cloud space only starts after the segment is completely received at the corresponding streaming server, which is time consuming and inefficient.

Figure 7:
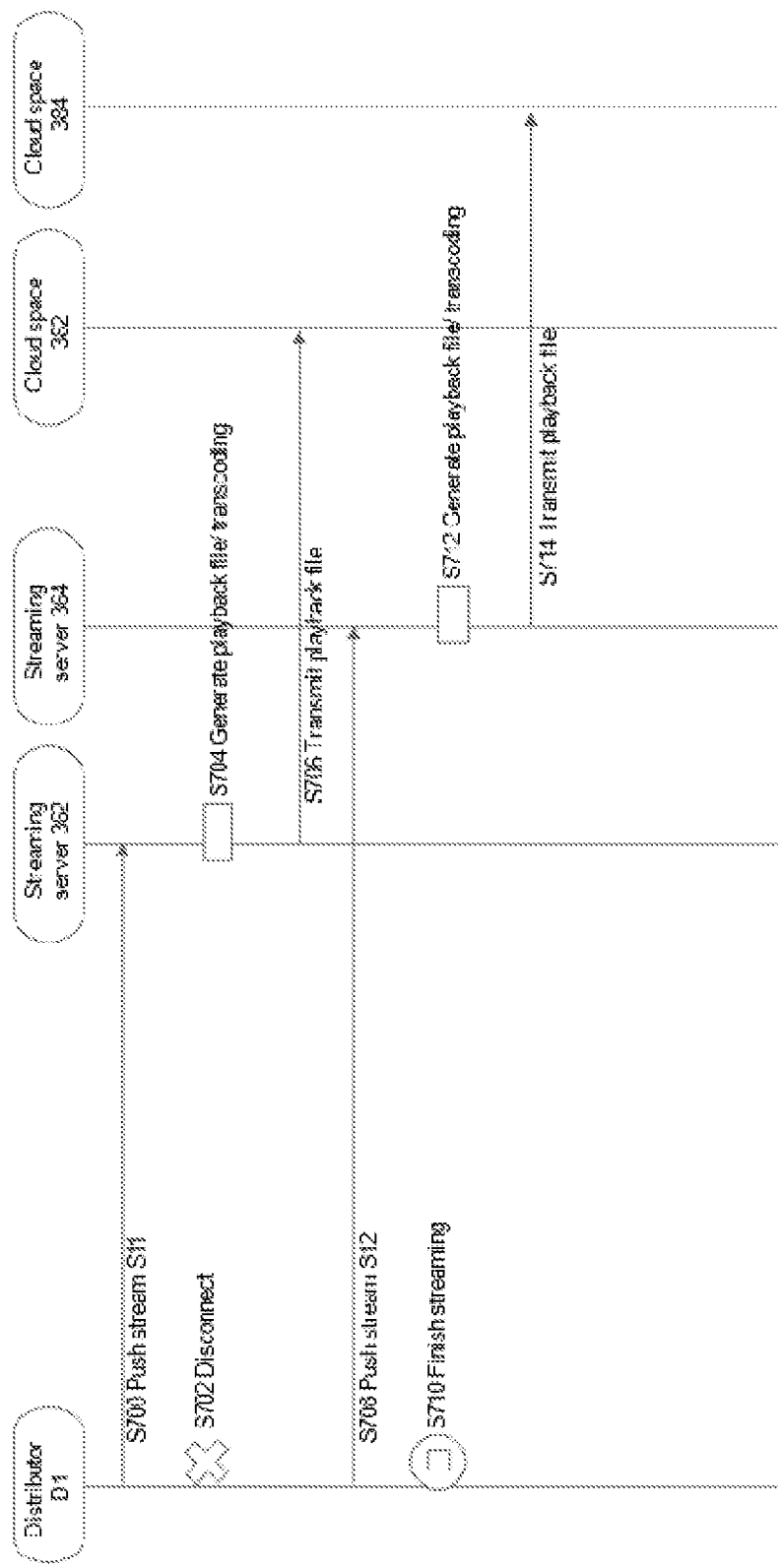
FIG. 7 shows an exemplary flow chart illustrating a method according to a related art.

FIG. 7 shows an exemplary flow chart illustrating a method according to the related art.

At step S700, a distributor D1 transmits stream segment S11 to a streaming server 362. The stream segment S11 is part of a stream file (or stream session) S1.

At step S702, the distributor D1 suffers an internet disconnection. Therefore, the rest of the stream file S11 has not yet been transmitted.

At step S704, the streaming server 362 generates a playback file based on the stream segment S1. A transcoding process may be performed on the stream segment S11.

At step S706, the streaming server 362 transmits the playback file to a cloud space 382 on a cloud server.

At step S708, the internet connection for distributor D1 recovers, and distributor D1 transmits stream segment S12 to a streaming server 364. The stream segment S12 is part of the stream file S1. Frequently, after an internet disconnection, the stream is likely to be transmitted to a different streaming server due to the allocation/distribution mechanism of a load balancer (not shown), for example.

At step S710, the distributor D1 finishes streaming.

At step S712, the streaming server 364 generates a playback file based on the stream segment S12. A transcoding process may be performed on the stream segment S12.

At step S714, the streaming server 364 transmits the playback file to a cloud space 384 on the cloud server. Because there is no way for the streaming server 364 to identify the space wherein the playback file for stream segment S1 is stored on the cloud server, the cloud space 384 is different from the cloud space 382.

The stream segments S11 and S12 belong to the same stream file (or the same stream session) S1. However, their playback files are separate and stored in different spaces on the cloud server. In the method above, an integrated playback file for the complete stream file S1 cannot be generated from separate stream segments S11 and S12.

The step S704 starts only after the step S702 happens (or only after S700 finishes). The step S706 starts only after the step S704 finishes. The step S712 starts only after the step S710 happens (or only after S708 finishes). The step S714 starts only after the step S712 finishes.

The present disclosure provides systems or methods to generate a playlist file and/or a playback file for playback of the complete stream in an efficient manner.

Figure 1:
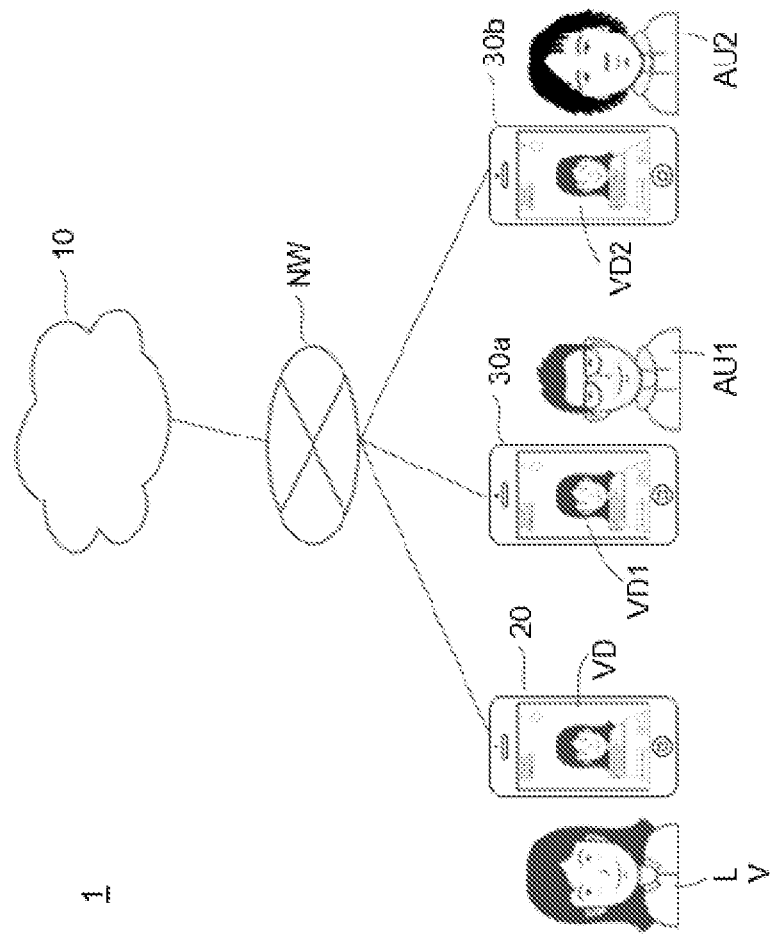
FIG. 1 shows a schematic configuration of a live streaming system 1 according to some embodiments of the present disclosure.

FIG. 1 shows a schematic configuration of a live streaming system 1 according to some embodiments of the present disclosure. The live streaming system 1 provides a live streaming service for the streaming streamer (could be referred to as liver, anchor, or distributor) LV and viewer (could be referred to as audience) AU (AU1, AU2 . . . ) to interact or communicate in real time. As shown in FIG. 1, the live streaming system 1 includes a server 10, a user terminal 20 and user terminals 30 (30a, 30b . . . ). In some embodiments, the streamers and viewers may be collectively referred to as users. The server 10 may include one or a plurality of information processing devices connected to a network NW. The user terminal 20 and 30 may be, for example, mobile terminal devices such as smartphones, tablets, laptop PCs, recorders, portable gaming devices, and wearable devices, or may be stationary devices such as desktop PCs. The server 10, the user terminal 20 and the user terminal 30 are interconnected so as to be able to communicate with each other over the various wired or wireless networks NW.

The live streaming system 1 involves the distributor LV, the viewers AU, and an administrator (or an APP provider, not shown) who manages the server 10. The distributor LV is a person who broadcasts contents in real time by recording the contents with his/her user terminal 20 and uploading them directly or indirectly to the server 10. Examples of the contents may include the distributor's own songs, talks, performances, gameplays, and any other contents. The administrator provides a platform for live-streaming contents on the server 10, and also mediates or manages real-time interactions between the distributor LV and the viewers AU. The viewer AU accesses the platform at his/her user terminal 30 to select and view a desired content. During live-streaming of the selected content, the viewer AU performs operations to comment, cheer, or send gifts via the user terminal 30. The distributor LV who is delivering the content may respond to such comments, cheers, or gifts. The response is transmitted to the viewer AU via video and/or audio, thereby establishing an interactive communication.

The term "live-streaming" may mean a mode of data transmission that allows a content recorded at the user terminal 20 of the distributor LV to be played or viewed at the user terminals 30 of the viewers AU substantially in real time, or it may mean a live broadcast realized by such a mode of transmission. The live-streaming may be achieved using existing live delivery technologies such as HTTP Live Streaming, Common Media Application Format, Web Real-Time Communications, Real-Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay with which interaction between the distributor LV and the viewers AU can be established. Note that the live-streaming is distinguished from so-called on-demand type transmission, in which the entire recorded data of the content is once stored on the server, and the server provides the data to a user at any subsequent time upon request from the user.

The term "video data" herein refers to data that includes image data (also referred to as moving image data) generated using an image capturing function of the user terminals 20 or 30, and audio data generated using an audio input function of the user terminals 20 or 30. Video data is reproduced in the user terminals 20 and 30, so that the users can view contents. In some embodiments, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server 10, the video data generated at the distributor's user terminal, the video data that passes through the server 10, and the video data received and reproduced at the viewer's user terminal are all the same video data.

In the example in FIG. 1, the distributor LV provides the live streaming data. The user terminal 20 of the distributor LV generates the streaming data by recording images and sounds of the distributor LV, and the generated data is transmitted to the server 10 over the network NW. At the same time, the user terminal 20 displays a recorded video image VD of the distributor LV on the display of the user terminal 20 to allow the distributor LV to check the live streaming contents currently performed.

The user terminals 30a and 30b of the viewers AU1 and AU2 respectively, who have requested the platform to view the live streaming of the distributor LV, receive video data related to the live streaming (may also be herein referred to as "live-streaming video data") over the network NW and reproduce the received video data to display video images VD1 and VD2 on the displays and output audio through the speakers. The video images VD1 and VD2 displayed at the user terminals 30a and 30b, respectively, are substantially the same as the video image VD captured by the user terminal 20 of the distributor LV, and the audio outputted at the user terminals 30a and 30b is substantially the same as the audio recorded by the user terminal 20 of the distributor LV.

Recording of the images and sounds at the user terminal 20 of the distributor LV and reproduction of the video data at the user terminals 30a and 30b of the viewers AU1 and AU2 are performed substantially simultaneously. Once the viewer AU1 types a comment about the contents provided by the distributor LV on the user terminal 30a, the server 10 displays the comment on the user terminal 20 of the distributor LV in real time and also displays the comment on the user terminals 30a and 30b of the viewers AU1 and AU2, respectively. When the distributor LV reads the comment and develops his/her talk to cover and respond to the comment, the video and sound of the talk are displayed on the user terminals 30a and 30b of the viewers AU1 and AU2, respectively. This interactive action is recognized as the establishment of a conversation between the distributor LV and the viewer AU1. In this way, the live streaming system 1 realizes the live streaming that enables interactive communication, not one-way communication.

Figure 2:
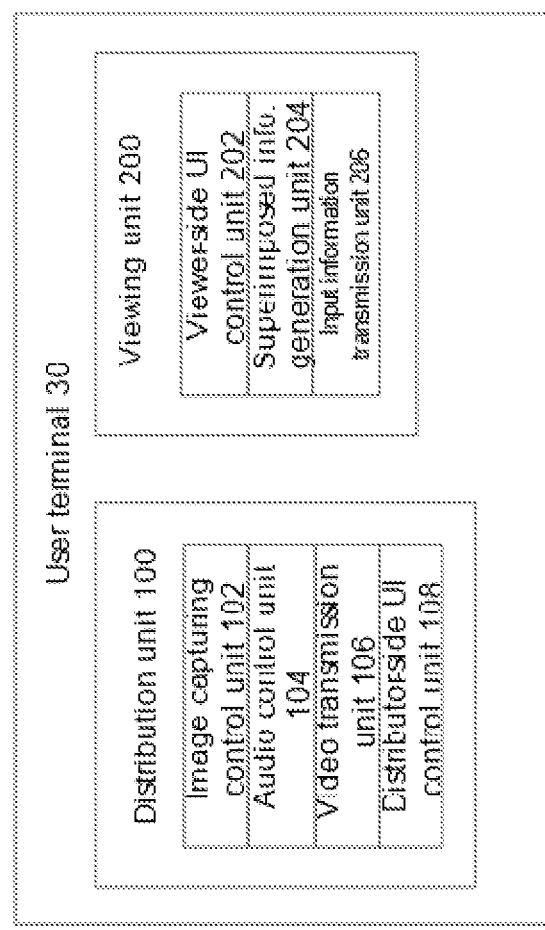
FIG. 2 is a block diagram showing functions and configuration of the user terminal 30 of FIG. 1 according to some embodiments of the present disclosure.

FIG. 2 is a block diagram showing functions and configuration of the user terminal 30 of FIG. 1 according to some embodiments of the present disclosure. The user terminal 20 has the same or similar functions and configuration as the user terminal 30. Each block in FIG. 2 and the subsequent block diagrams may be realized by elements such as a computer CPU or a mechanical device in terms of hardware, and can be realized by a computer program or the like in terms of software. Functional blocks could be realized by cooperative operation between these elements. Therefore, it is understood by those skilled in the art that these functional blocks can be realized in various forms by combining hardware and software.

The distributor LV and the viewers AU may download and install a live streaming application program (hereinafter referred to as a live streaming application) to the user terminals 20 and 30 from a download site over the network NW. Alternatively, the live streaming application may be pre-installed on the user terminals 20 and 30. When the live streaming application is executed on the user terminals 20 and 30, the user terminals 20 and 30 communicate with the server 10 over the network NW to implement or execute various functions. Hereinafter, the functions implemented by the user terminals 20 and 30 (processors such as CPUs) in which the live streaming application is run will be described as functions of the user terminals 20 and 30. These functions are realized in practice by the live streaming application on the user terminals 20 and 30. In some embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 30 includes a distribution unit 100 and a viewing unit 200. The distribution unit 100 generates video data in which the user's (or the user side's) image and sound are recorded, and provides the video data to the server 10. The viewing unit 200 receives video data from the server 10 to reproduce the video data. The user activates the distribution unit 100 when the user performs live streaming, and activates the viewing unit 200 when the user views a video. The user terminal in which the distribution unit 100 is activated is the distributor's terminal, i.e., the user terminal that generates the video data. The user terminal in which the viewing unit 200 is activated is the viewer's terminal, i.e., the user terminal in which the video data is reproduced and played.

The distribution unit 100 includes an image capturing control unit 102, an audio control unit 104, a video transmission unit 106, and a distribution-side UI control unit 108. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time. The distribution-side UI control unit 108 controls an UI (user interface) for the distributor. The distribution-side UI control unit 108 may be connected to a display (not shown in FIG. 2), and displays a video on the display by reproducing the video data that is to be transmitted by the video transmission unit 106. The distribution-side UI control unit 108 may display an operation object or an instruction-accepting object on the display, and accepts inputs from the distributor who taps on the object.

The viewing unit 200 includes a viewer-side UI control unit 202, a superimposed information generation unit 204, and an input information transmission unit 206. The viewing unit 200 receives, from the server 10 over the network NW, video data related to the live streaming in which the distributor, the viewer who is the user of the user terminal 30, and other viewers participate. The viewer-side UI control unit 202 controls the UI for the viewers. The viewer-side UI control unit 202 is connected to a display and a speaker (not shown in FIG. 2), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 2) such as touch panels, keyboards, and displays, and obtains user input via these input means. The superimposed information generation unit 204 superimposes a predetermined frame image on an image generated from the video data from the server 10. The frame image includes various user interface objects (hereinafter simply referred to as "objects") for accepting inputs from the user, comments entered by the viewers, and/or information obtained from the server 10. The input information transmission unit 206 transmits the user input obtained by the viewer-side UI control unit 202 to the server 10 over the network NW.

Figure 3:
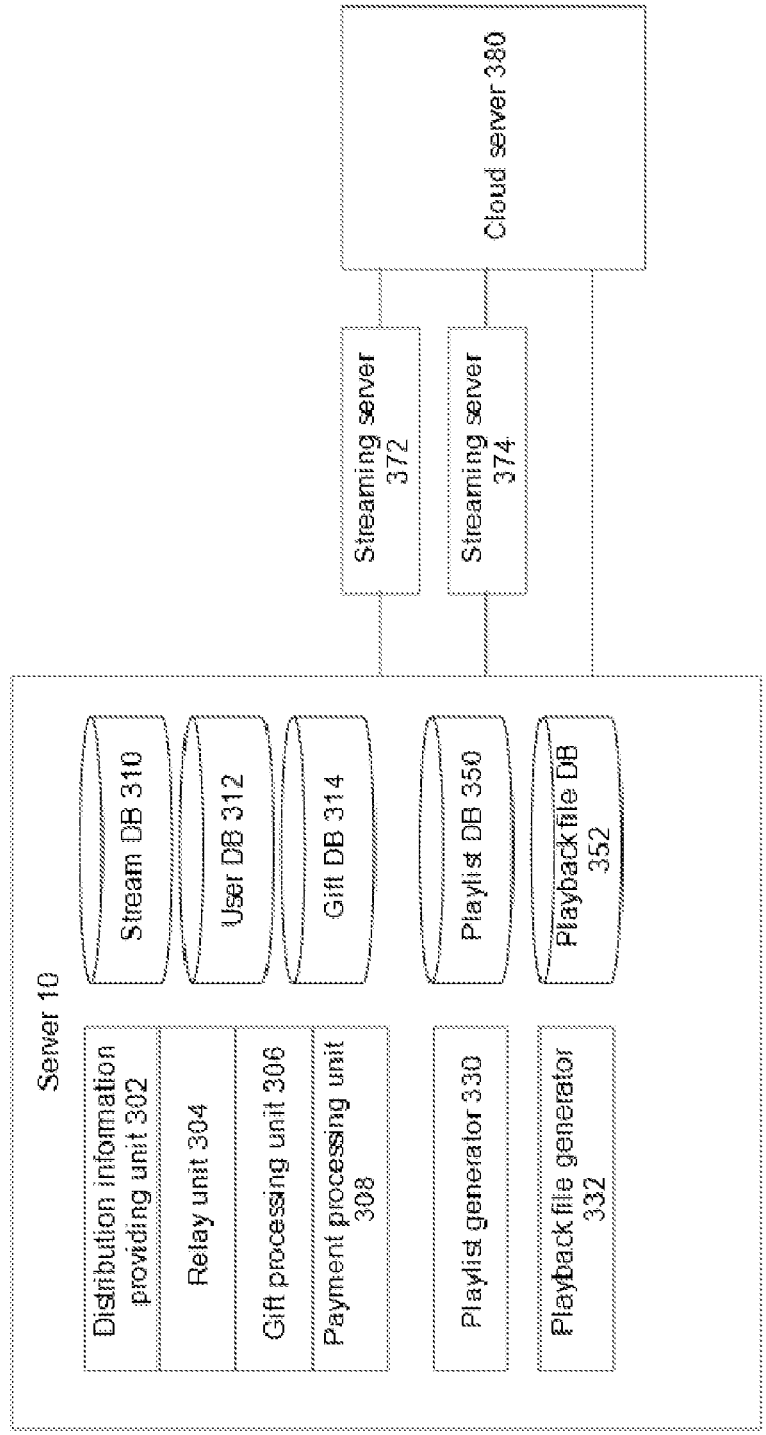
FIG. 3 shows a block diagram illustrating functions and configuration of the server of FIG. 1 according to some embodiments of the present disclosure.

FIG. 3 shows a block diagram illustrating functions and configuration of the server 10 of FIG. 1 according to some embodiments of the present disclosure. The server 10 includes a distribution information providing unit 302, a relay unit 304, a gift processing unit 306, a payment processing unit 308, a stream DB 310, a user DB 312, a gift DB 314, a playlist generator 330, a playback file generator 332, a playlist DB 350, and a playback file DB 352. The server 10 communicates with a streaming server 372, a streaming server 374, and a cloud server 380. In some embodiments, the streaming servers 372 and 374 can be implemented within the server 10.

Upon reception of a notification or a request from the user terminal 20 on the distributor side to start a live streaming over the network NW, the distribution information providing unit 302 registers a stream ID for identifying this live streaming and the distributor ID of the distributor who performs the live streaming in the stream DB 310.

When the distribution information providing unit 302 receives a request to provide information about live streams from the viewing unit 200 of the user terminal 30 on the viewer side over the network NW, the distribution information providing unit 302 retrieves or checks currently available live streams from the stream DB 310 and makes a list of the available live streams. The distribution information providing unit 302 transmits the generated list to the requesting user terminal 30 over the network NW. The viewer-side UI control unit 202 of the requesting user terminal 30 generates a live stream selection screen based on the received list and displays it on the display of the user terminal 30.

Once the input information transmission unit 206 of the user terminal 30 receives the viewer's selection result on the live stream selection screen, the input information transmission unit 206 generates a distribution request including the stream ID of the selected live stream, and transmits the request to the server 10 over the network NW. The distribution information providing unit 302 starts providing, to the requesting user terminal 30, the live stream specified by the stream ID included in the received distribution request. The distribution information providing unit 302 updates the stream DB 310 to include the user ID of the viewer of the requesting user terminal 30 into the viewer IDs of (or corresponding to) the stream ID.

The relay unit 304 relays the video data from the distributor-side user terminal 20 to the viewer-side user terminal 30 in the live streaming started by the distribution information providing unit 302. The relay unit 304 receives from the input information transmission unit 206 a signal that represents user input by a viewer during the live streaming or reproduction of the video data. The signal that represents user input may be an object specifying signal for specifying an object displayed on the display of the user terminal 30. The object specifying signal may include the viewer ID of the viewer, the distributor ID of the distributor of the live stream that the viewer watches, and an object ID that identifies the object. When the object is a gift, the object ID is the gift ID. Similarly, the relay unit 304 receives, from the distribution unit 100 of the user terminal 20, a signal that represents user input performed by the distributor during reproduction of the video data (or during the live streaming). The signal could be an object specifying signal.

Alternatively, the signal that represents user input may be a comment input signal including a comment entered by a viewer into the user terminal 30 and the viewer ID of the viewer. Upon reception of the comment input signal, the relay unit 304 transmits the comment and the viewer ID included in the signal to the user terminal 20 of the distributor and the user terminals 30 of other viewers. In these user terminals 20 and 30, the viewer-side UI control unit 202 and the superimposed information generation unit 204 display the received comment on the display in association with the viewer ID also received.

The gift processing unit 306 updates the user DB 312 so as to increase the points of the distributor depending on the points of the gift identified by the gift ID included in the object specifying signal. Specifically, the gift processing unit 306 refers to the gift DB 314 to specify the points to be granted for the gift ID included in the received object specifying signal. The gift processing unit 306 then updates the user DB 312 to add the determined points to the points of (or corresponding to) the distributor ID included in the object specifying signal.

The payment processing unit 308 processes payment of a price of a gift from a viewer in response to reception of the object specifying signal. Specifically, the payment processing unit 308 refers to the gift DB 314 to specify the price points of the gift identified by the gift ID included in the object specifying signal. The payment processing unit 308 then updates the user DB 312 to subtract the specified price points from the points of the viewer identified by the viewer ID included in the object specifying signal.

FIG. 4 is a data structure diagram of an example of the stream DB 310 of FIG. 3. The stream DB 310 holds information regarding a live stream currently taking place. The stream DB 310 stores the stream ID, the distributor ID, and the viewer ID, in association with each other. The stream ID is for identifying a live stream on a live streaming platform provided by the live streaming system 1. The distributor ID is a user ID for identifying the distributor who provides the live stream. The viewer ID is a user ID for identifying a viewer of the live stream. In the live streaming platform provided by the live streaming system 1 of some embodiments, when a user starts a live stream, the user becomes a distributor, and when the same user views a live stream broadcast by another user, the user also becomes a viewer. Therefore, the distinction between a distributor and a viewer is not fixed, and a user ID registered as a distributor ID at one time may be registered as a viewer ID at another time.

FIG. 5 is a data structure diagram showing an example of the user DB 312 of FIG. 3. The user DB 312 holds information regarding users. The user DB 312 stores the user ID and the point, in association with each other. The user ID identifies a user. The point corresponds to the points the corresponding user holds. The point is the electronic value circulated within the live streaming platform. In some embodiments, when a distributor receives a gift from a viewer during a live stream, the distributor's points increase by the value corresponding to the gift. The points are used, for example, to determine the amount of reward (such as money) the distributor receives from the administrator of the live streaming platform. In some embodiments, when the distributor receives a gift from a viewer, the distributor may be given the amount of money corresponding to the gift instead of the points.

FIG. 6 is a data structure diagram showing an example of the gift DB 314 of FIG. 3. The gift DB 314 holds information regarding gifts available for the viewers in the live streaming. A gift is electronic data. A gift may be purchased with the points or money, or can be given for free. A gift may be given by a viewer to a distributor. Giving a gift to a distributor is also referred to as using, sending, or throwing the gift. Some gifts may be purchased and used at the same time, and some gifts may be purchased and then used at any time later by the purchaser viewer. When a viewer gives a gift to a distributor, the distributor is awarded the amount of points corresponding to the gift. When a gift is used, the use may trigger an effect associated with the gift. For example, an effect (such as visual or sound effect) corresponding to the gift will appear on the live streaming screen.

The gift DB 314 stores the gift ID, the awarded points, and the price points, in association with each other. The gift ID is for identifying a gift. The awarded points are the amount of points awarded to a distributor when the gift is given to the distributor. The price points are the amount of points to be paid for use (or purchase) of the gift. A viewer is able to give a desired gift to a distributor by paying the price points of the desired gift when the viewer is viewing the live stream. The payment of the price points may be made by an appropriate electronic payment means. For example, the payment may be made by the viewer paying the price points to the administrator. Alternatively, bank transfers or credit card payments may be used. The administrator is able to desirably set the relationship between the awarded points and the price points. For example, it may be set as the awarded points=the price points. Alternatively, points obtained by multiplying the awarded points by a predetermined coefficient such as 1.2 may be set as the price points, or points obtained by adding predetermined fee points to the awarded points may be set as the price points.

The streaming server (372 or 374) is configured to receive stream files (such as video or audio stream files) from users. The streaming server may receive a stream file from a user terminal of a distributor. A stream file is a complete stream (or stream session) and corresponds to one distributor ID and one stream ID. The streaming server may receive the distributor ID and the stream ID along with the stream file (or segments of the stream file). A unique key may be generated for each stream file according to the distributor ID and the stream ID. The unique key corresponds to the stream file. In some embodiments, the streaming server receives the unique key along with the stream file. In some embodiments, the streaming server generates the unique key when receiving a stream file. In some embodiments, a stream file is defined by a start action (or start signal) of the streaming from the distributor and a finish action (or finish signal) of the streaming from the distributor.

During reception of the stream file, the streaming server (372 or 374) continuously (or parallelly) transforms the received parts of the stream file into stream portions. In some embodiments, a transcoding process may be involved in the transforming process. In some embodiments, a stream portion may have a transport stream (TS) format. In some embodiments, a stream portion may be a cut portion from the stream file. The streaming server generates and attaches a timestamp for each stream portion.

In some embodiments, the streaming server may generate a folder (or a space, or a file) within the streaming server, and store the stream portions (or transformed stream portions) within the folder. The folder is generated according to the unique key. The folder corresponds to the unique key. For the same stream file, its stream portions generated on one streaming server (372 or 374) are stored in the same folder on the streaming server.

During transforming the stream file into the stream portions, the streaming server (372 or 374) continuously (or parallelly) transmits the stream portions (or transformed stream portions) and their respective timestamps to a cloud space on the cloud server 380. The cloud space is specified by the unique key. The cloud space uniquely corresponds to the unique key. Stream portions corresponding to the same unique key are transmitted to the same cloud space. A streaming server may transmit a first portion (or transformed portion) of the stream file to the cloud space while generating (or transforming) a second portion of the stream file.

In some embodiments, the streaming server transfers or updates the folder (wherein the stream portions are stored in the server) to the cloud space of the cloud server. Therefore, the cloud space could be specified by the unique key corresponding to the folder. In some embodiments, the folder could be a temperate folder that will be removed after all the stream portions are transmitted to the cloud server.

The streaming server (372 or 374) is configured to transmit stream portion information of the stream portions stored on the streaming server to the playlist generator 330. The streaming portion information may include the count number of the stream portions, their respective timestamps, and the unique key.

The playlist generator 330 is configured to generate a playlist file for a stream file. The playlist generator 330 compares or synchronizes stream portions stored on a streaming server and stream portions transferred to or updated to (and stored on) the cloud space. The playlist generator 330 determines or makes sure that stream portions on a streaming server and stream portions updated to the cloud space are consistent. The playlist generator 330 generates the playlist file according to stream portion information received from a streaming server. The generated playlist file is stored in the playlist DB 350, and is also uploaded to the cloud space.

The playback file generator 332 is configured to generate a playback file for a stream file. The playback file generator 332 may receive stream portions from a streaming server, and utilize the corresponding playlist file and the stream portions to generate one complete playback file. The playback file generator 332 may perform transcoding processes on the stream portions, and generate a playback file that has a format requested by a stakeholder (user or client of a streaming platform, for example). The generated playback file is stored in the playback file DB 352, and could be uploaded to the cloud server 380.

In some embodiments, the cloud server 380 could be a Google GCS server. In some embodiments, the cloud server 380 could be an Amazon S3 server.

Figure 8:
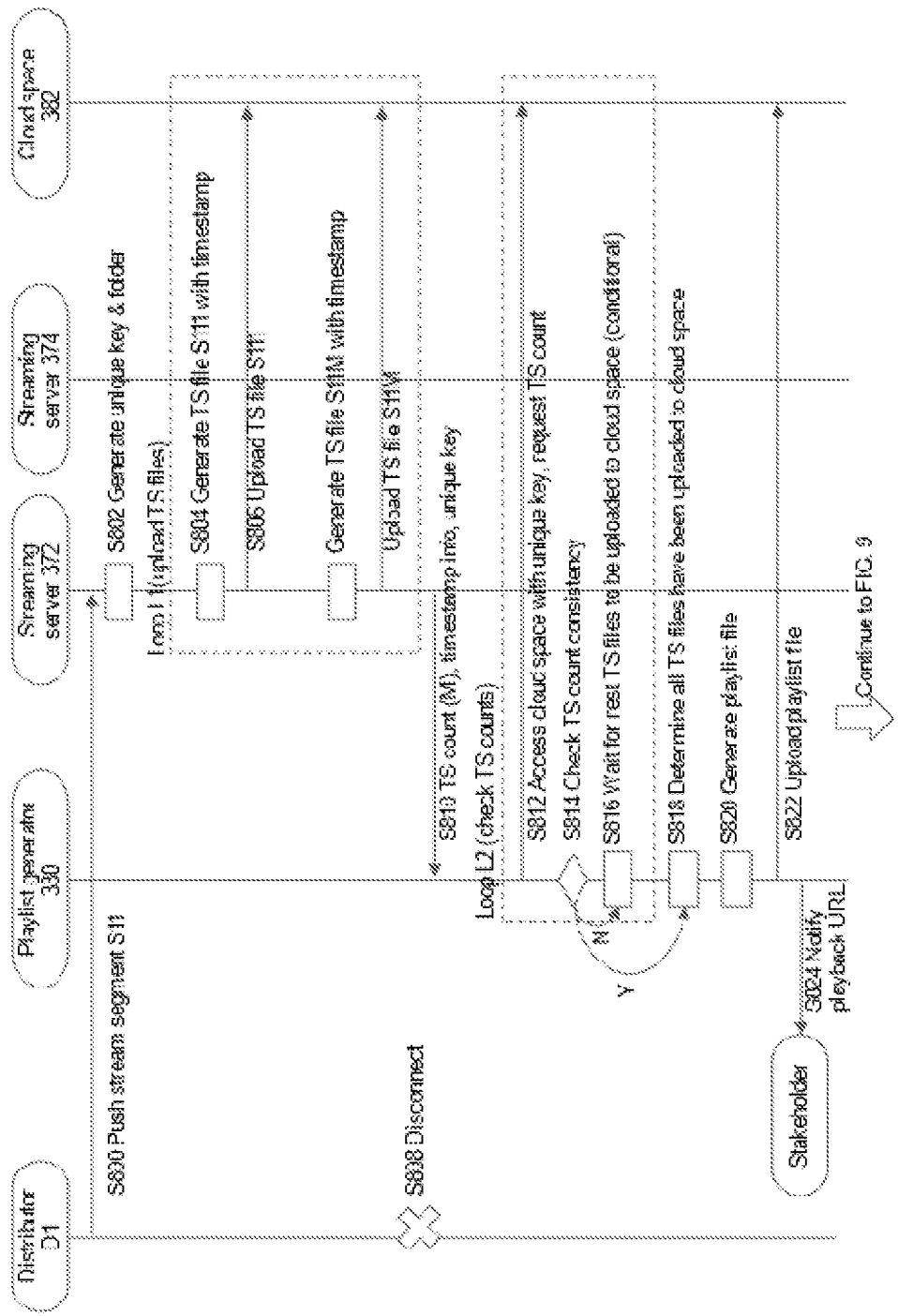
FIG. 8 and FIG. 9 show an exemplary sequence chart illustrating a method according to some embodiments of the present disclosure.
Figure 9:
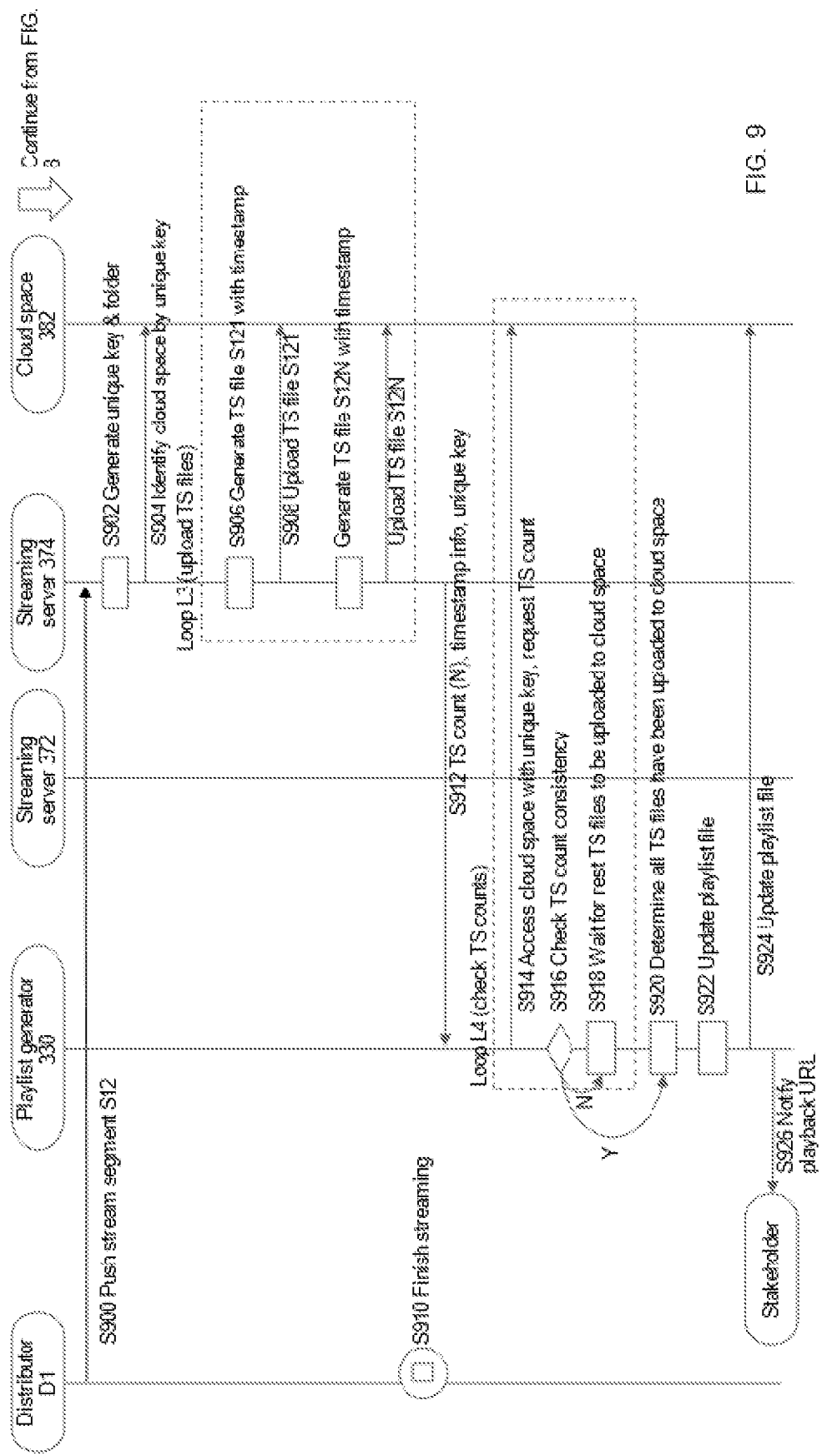

FIG. 8 and FIG. 9 show an exemplary sequence chart illustrating a method according to some embodiments of the present disclosure.

At step S800, the distributor D1 transmits stream segment S11 to a streaming server 372. The stream segment S11 is part of a stream file (or stream session) S1. The user ID of distributor D1 and the stream ID of the stream file S1 are also transmitted to the streaming server 372.

At step S802, the streaming server 372 generates a unique key according to the user ID and the stream ID, and generates a temperate folder (or a space, or a file) on the streaming server 372 according to the unique key.

Subsequently, the flow enters the loop L1, wherein TS files (or stream portions) are generated and uploaded to the cloud server.

At step S804, the streaming server 372 generates a TS file S111 and attaches a timestamp onto it. The TS file S111 is generated from the stream segment S11. A transcoding process or a video cut process could be involved. The TS file S111 is stored into the temperate folder.

At step S806, the streaming server 372 uploads the TS file S111 to a cloud space 382 on the cloud server 380. The uploading process may include uploading/updating/copying the whole temperate folder onto the cloud space 382. The temperate folder is specified by the unique key, therefore, the cloud space 382 is specified by the unique key.

Steps similar to steps S804 and S806 are repeated. TS files S112, S113, . . . , S11M are generated from the stream segment S11, attached with timestamps sequentially, and uploaded to the cloud space 382. The stream segment S11 is transformed into M pieces of TS files. The number M could be referred to as the TS count for the stream segment S11 on the streaming server 372.

At step S808, the distributor D1 suffers an internet disconnection. Therefore, the rest of the stream file S1 has not yet been transmitted.

At step S810, the streaming server 372 transmits the TS count, timestamp information and the unique key to the playlist generator 330. In some embodiments, the TS count and the timestamp information could be referred to as stream portion information.

Subsequently, the flow enters the loop L2, wherein TS count consistency is checked between the streaming server 372 and the cloud space 382. At the timing of the internet disconnection, it is possible that not all TS files have been transmitted from the streaming server 372 to the cloud space 382.

At step S812, the playlist generator 330 accesses the cloud space 382 with the unique key, and requests for the TS count and timestamp information of the TS files stored on the cloud space 382.

At step S814, the playlist generator 330 checks the consistency between the TS count on the streaming server 372 (which is M) and the TS count on the cloud space 382 (for example, in the period specified by the timestamp information). If the consistency is determined, the flow goes to step S818, otherwise the flow goes to step S816.

At step S816, the playlist generator 330 waits for the rest TS files (on the streaming server 372) to be uploaded to the cloud space 382. In some embodiments, the waiting time could be set to be equal to or greater than the uploading time period for a TS file to be uploaded from the streaming server 372 to the cloud space 382.

For example, when the playlist generator 330 determines the TS files (or stream portions) stored on the cloud space 382 to lack some portions (compared with the TS files on the streaming server 372) according to the TS count and the timestamp information (at step S814), the generator 330 waits for the streaming server 372 to transmit the rest portions to the cloud space 372. In some embodiments, the waiting step could be referred to as remaining stream portion transmission waiting.

A portion of the loop L2 (steps S812. S814 and/or S816) may overlap with (or may be performed at the same time as) a portion of the loop L1 (such as generating and uploading the final TS file(s)). In some embodiments, the step S810 may also overlap with the last few steps of the loop L1.

At step S818, the playlist generator 330 determines that all TS files on the streaming server 372 have been uploaded to the cloud space 382.

At step S820, the playlist generator 330 generates a playlist file according to the TS count and the timestamp information.

At step S822, the playlist generator 330 uploads the playlist file to the cloud space 382.

At step S824, the playlist generator 330 notifies a playback URL to a stakeholder. The playback URL is configured to access or address the cloud space 382 wherein the playlist file and the TS files are stored. In some embodiments, the playback URL corresponds to the unique key. The playback URL could be obtained at step S812, for example. The stakeholder may be a backend server, or a user terminal of a user who wants to see the playback of the streaming. The playback (or replay) of the streaming can be performed with the playlist file and the TS files FIG. 9 is a continuation of FIG. 8.

At step S900, the internet connection for distributor D1 recovers, and distributor D1 transmits stream segment S12 to a streaming server 374. The stream segment S12 is part of the stream file S1. The user ID of distributor D1 and the stream ID of the stream file S1 are also transmitted to the streaming server 374.

At step S902, the streaming server 374 generates a unique key according to the user ID and the stream ID, and generates a temperate folder (or a space, or a file) on the streaming server 374 according to the unique key. Because the user ID and the stream ID also correspond to the stream file S1, the unique key is the same as the unique key generated at step S802.

At step S904, the streaming server 374 identifies the cloud space 382 by the unique key. The streaming server 374 may use the unique key to perform a search process on the cloud server 380 to address the cloud space 382. In some embodiments, a fetch-or-create process may be performed by the streaming server 374.

Subsequently, the flow enters the loop L3, wherein TS files are generated and uploaded to the cloud space 382.

At step S906, the streaming server 374 generates a TS file S121 and attaches a timestamp onto it. The TS file S121 is generated from the stream segment S12. A transcoding process or a video cut process could be involved. The TS file S121 is stored into the temperate folder.

At step S908, the streaming server 374 uploads the TS file S121 to the cloud space 382 on the cloud server 380. The uploading process may include uploading/updating/copying the whole temperate folder onto the cloud space 382.

Steps similar to steps S906 and S908 are repeated. TS files S122, S123, . . . , S12N are generated from the stream segment S12, attached with timestamps sequentially, and uploaded to the cloud space 382. The stream segment S12 is transformed into N pieces of TS files. The number N could be referred to as the TS count for the stream segment S12 on the streaming server 374.

At step S910, the distributor D1 finishes streaming. The distributor D1 may send out a stream end signal with the stream ID of the stream file S1.

At step S912, the streaming server 374 transmits the TS count, timestamp information and the unique key to the playlist generator 330.

Subsequently, the flow enters the loop L4, wherein TS count consistency is checked between the streaming server 374 and the cloud space 382.

At step S914, the playlist generator 330 accesses the cloud space 382 with the unique key, and requests for the TS count and timestamp information of the TS files stored on the cloud space 382.

At step S916, the playlist generator 330 checks the consistency between the TS count on the streaming server 374 (which is N) and the TS count on the cloud space 382 (for example, in the period specified by the timestamp information). If the consistency is determined, the flow goes to step S920, otherwise the flow goes to step S918.

At step S918, the playlist generator 330 waits for the rest TS files (on the streaming server 374) to be uploaded to the cloud space 382. In some embodiments, the waiting time could be set to be equal to or greater than the uploading time period for a TS file to be uploaded from the streaming server 374 to the cloud space 382.

A portion of the loop L4 (steps S914, S916 and/or S918) may overlap with (or may be performed at the same time as) a portion of the loop L3 (such as generating and uploading the final TS file(s)). In some embodiments, the step S912 may also overlap with the last few steps of the loop L3.

At step S920, the playlist generator 330 determines that all TS files on the streaming server 374 have been uploaded to the cloud space 382.

At step S922, the playlist generator 330 updates the playlist file according to the TS count and the timestamp information. The playlist generator 330 may specify the playlist file with the unique key.

At step S924, the playlist generator 330 uploads (or updates) the playlist file to the cloud space 382.

At step S926, the playlist generator 330 notifies the playback URL to a stakeholder. Since the unique key is the same, the playback URL is the same as the playback URL in step S824. The stakeholder may be a backend server, or a user terminal of a user who wants to see the playback of the streaming. The playback of the streaming can be performed with the playlist file and the TS files.

Figure 10:
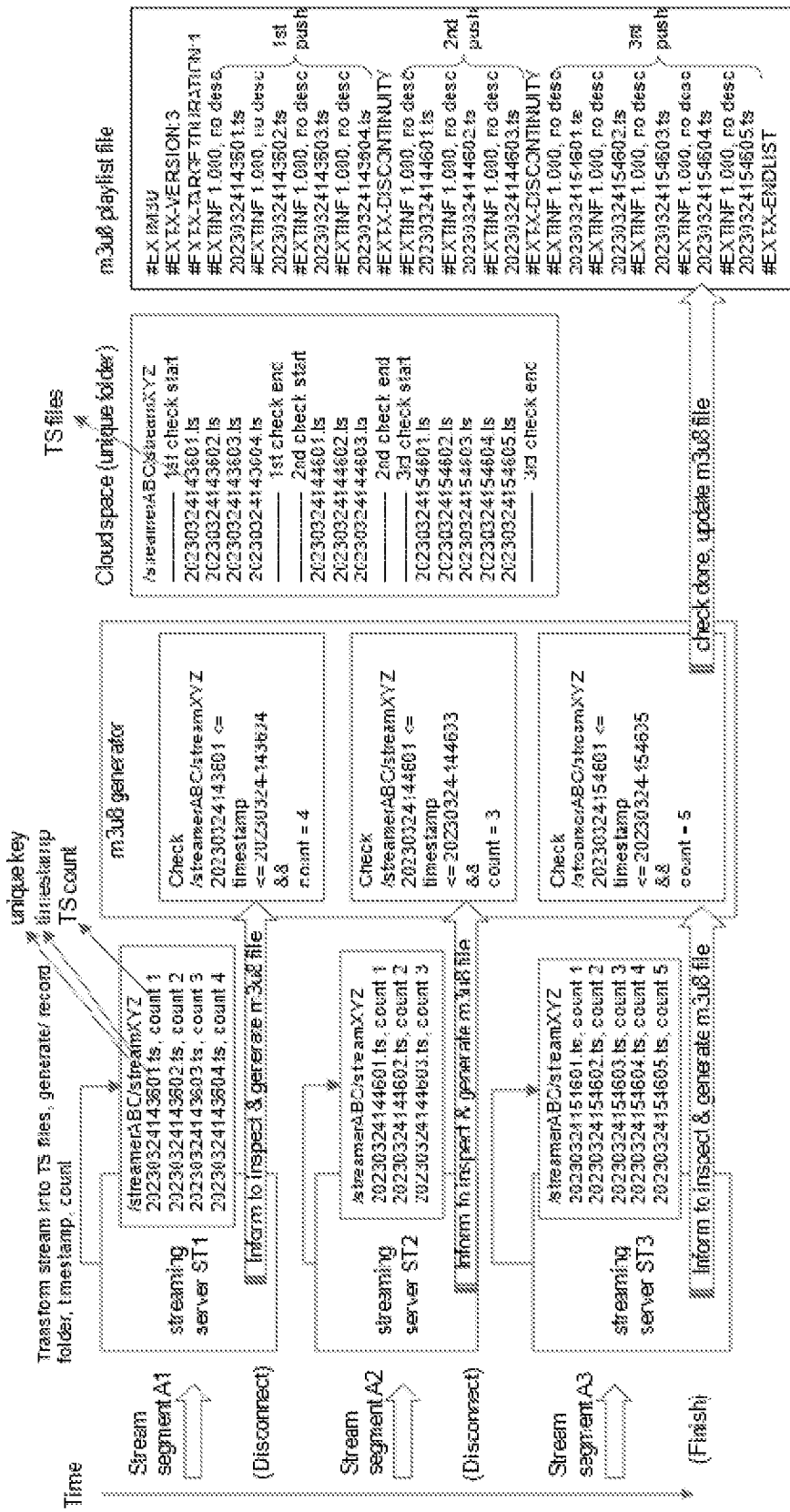
FIG. 10 shows exemplary data structures according to some embodiments of the present disclosure.

FIG. 10 shows exemplary data structures according to some embodiments of the present disclosure.

As shown in FIG. 10, due to disconnections of the internet (at the distributor side, for example), stream segments A1, A2 and A3 are transmitted to different streaming servers ST1, ST2 and ST3. The stream segments A1, A2 and A3 belong to the same stream session (or stream file), and therefore correspond to the same streamerID/distributor ID (ABC) and the same stream ID (XYZ). Each streaming server creates a unique key (/streamerABC/streamXYZ) according to the distributor ID and the stream ID, generates a folder according to the unique key, transforms the respective stream segment into TS files, attaches timestamps to the TS files, and calculate the TS count.

The folders (and the TS files and the unique key) are transmitted to the cloud space. Because the unique key is the same for the three stream segments, the TS files are transmitted to the same cloud space on the cloud server. The cloud space also corresponds to the unique key.

When a stream segment ends (due to internet disconnection or due to stream finish), the corresponding streaming server informs the m3u8 generator to check TS file information (TS count and timestamp) consistency between the streaming server and the cloud space.

When the TS file information consistency check is done, the m3u8 generator generates or updates the playlist file. The tag "EXT-X-ENDLIST" would always be updated to the bottom when new TS file information is added to the m3u8 playlist file.

The present disclosure can generate a playlist file for the playback of the complete stream file from separate stream segments of the stream file. The present disclosure can update the playlist file in a dynamic manner whenever an internet disconnection is encountered by the distributor. The present disclosure utilizes timestamps to ensure that the stream portions on the cloud space could be replayed in a correct order. The present disclosure utilizes a playlist generator to perform processes such as stream portion information check or remaining stream portion transmission waiting, to ensure the completeness of the stream portions on the cloud space. The present disclosure utilizes a unique key, which corresponds to the distributor ID and the stream ID, to ensure that all stream portions of the same stream file could be stored in the same cloud space. The processes such as receiving stream segments from a distributor, generating stream portions, and uploading stream portions to the cloud server, could be performed simultaneously or parallelly by the streaming server. The playlist file could be generated in a more dynamic and fast manner.

Figure 11:
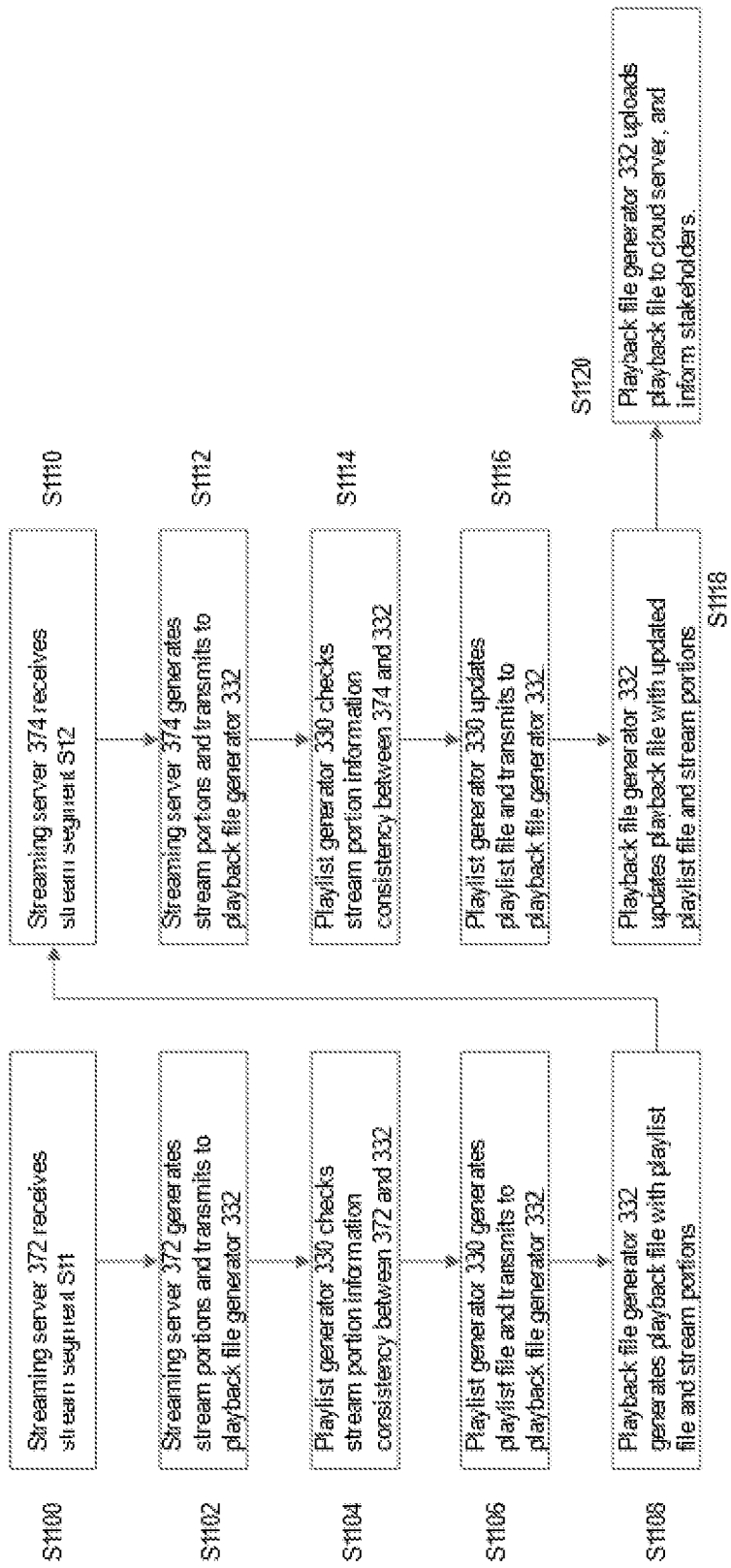
FIG. 11 shows an exemplary flow chart illustrating a method according to some embodiments of the present disclosure.

FIG. 11 shows an exemplary flow chart illustrating a method according to some embodiments of the present disclosure. Stream segment S11 and stream segment S12 belong to one complete stream file S1, and are transmitted separately from a distributor due to internet disconnection.

At step S1100, the streaming server 372 receives stream segment S11 from the distributor. The stream segment S11 may have a TS or an FLV format, or other format. The streaming server 372 generates a unique key according to the distributor ID and the stream ID.

At step S1102, the streaming server 372 generates stream portions from the stream segment S11, attaches timestamps to the stream portions, and transmits the stream portions and the unique key to the playback file generator 332.

At step S1104, the playlist generator 330 checks stream portion information (such as stream portion count and timestamp) consistency between stream portions on the streaming server 372 and stream portions on the playback file generator 332. The unique key may be used to identify the respective stream portions to be compared. The playlist generator 330 makes sure all stream portions are transmitted from the streaming server 372 to the playback file generator 332.

At step S1106, the playlist generator 330 generates a playlist file according to the stream portion information, and transmits the playlist file to the playback file generator 332. The playlist file may have a m3u8 format.

At step S1108, the playback file generator 332 generates a playback file according to the playlist file and the stream portions received from the streaming server 372. A transcoding process may be involved in generating the playback file. The playback file may have an MP4 or MKV format, or other format. In some embodiments, the format of the playback file can be set by a setting signal from a user or an operator of the streaming system. In some embodiments, the playback file may have similar formats with the data stored in the cloud space as shown in FIG. 10.

At step SF110, the streaming server 374 receives stream segment S12 from the distributor. The streaming server 374 generates a unique key according to the distributor ID and the stream ID. Because stream segments S12 and S11 correspond to the same stream file S1, they share the same distributor ID and the same stream ID. Therefore, the unique key generated in step S1110 is the same as the unique key generated in step S1100.

At step S1112, the streaming server 374 generates stream portions from the stream segment S12, attaches timestamps to the stream portions, and transmits the stream portions and the unique key to the playback file generator 332.

At step S1114, the playlist generator 330 checks stream portion information (such as stream portion count and timestamp) consistency between stream portions on the streaming server 374 and stream portions on the playback file generator 332. The unique key and the timestamps may be used to identify the respective stream portions to be compared. The playlist generator 330 makes sure all stream portions are transmitted from the streaming server 374 to the playback file generator 332.

At step S1116, the playlist generator 330 updates the playlist file according to the stream portion information (and the unique key), and transmits the updated playlist file to the playback file generator 332.

At step S1118, the playback file generator 332 updates the playback file according to the updated playlist file and the stream portions received from the streaming server 374. The unique key may be used to identify the playback file to be updated. A transcoding process may be involved in updating the playback file. The updated playback file corresponds to the complete stream file S1, and can be used for playback of the stream file S1.

At step S1120, the playback file generator 332 uploads the playback file to the cloud server 380, and informs stakeholders of the URL for accessing the playback file.

In this embodiment, reception of a stream segment, generating stream portions from the segment, and transmitting the stream portions to the playback file generator can be performed simultaneously or parallelly. The stream portion information consistency check ensures the completeness of the playback file. The present disclosure can generate, in a time efficient manner, a playback file for the playback of the complete stream file from separate stream segments of the stream file.

Figure 12:
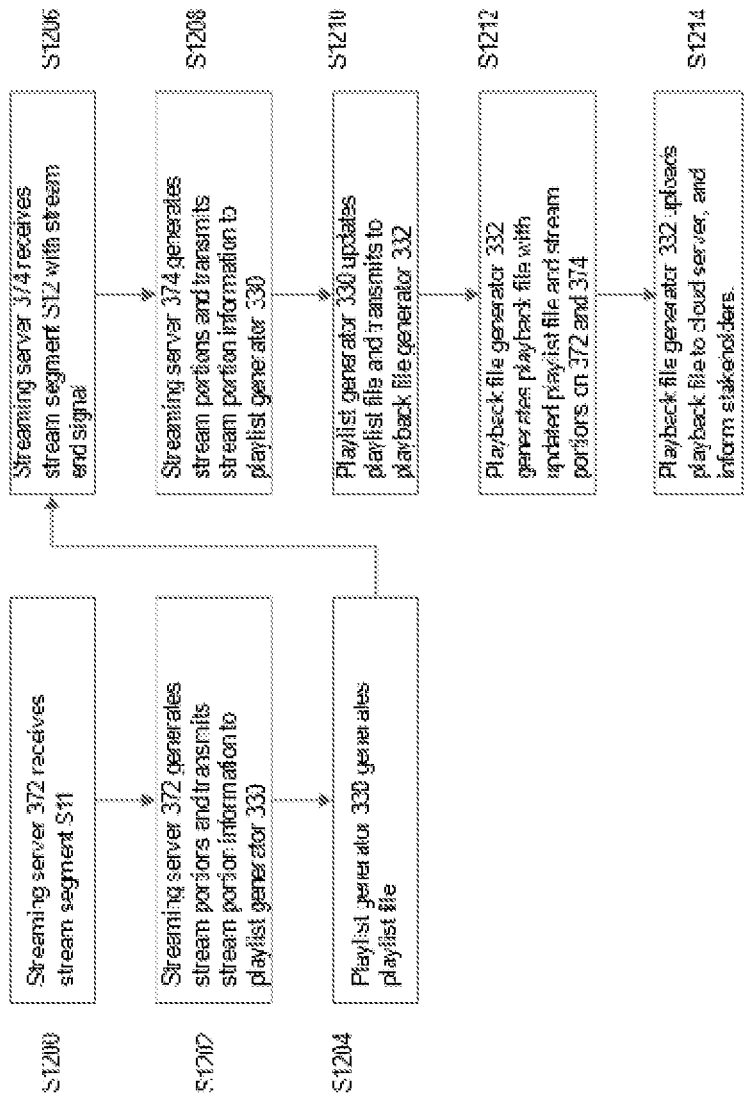
FIG. 12 shows an exemplary flow chart illustrating a method according to some embodiments of the present disclosure.

FIG. 12 shows an exemplary flow chart illustrating a method according to some embodiments of the present disclosure. Stream segment S11 and stream segment S12 belong to one complete stream file S1, and are transmitted separately from a distributor due to internet disconnection.

At step S1200, the streaming server 372 receives stream segment S11 from the distributor. The streaming server 372 generates a unique key according to the distributor ID and the stream ID.

At step S1202, the streaming server 372 generates stream portions from the stream segment S11, attaches timestamps to the stream portions, and transmits the stream portion information and the unique key to the playlist generator 330.

At step S1204, the playlist generator 330 generates a playlist file according to the stream portion information. The playlist file corresponds to the unique key.

At step S1206, the streaming server 374 receives stream segment S12 and (or with) a stream end signal from the distributor. The streaming server 374 generates a unique key according to the distributor ID and the stream ID. The unique key is the same as the unique key generated at step S1200.

At step S1208, the streaming server 374 generates stream portions from the stream segment S12, attaches timestamps to the stream portions, and transmits the stream portion information and the unique key to the playlist generator 330. The stream portion information includes the stream end signal.

At step S1210, the playlist generator 330 updates the playlist file according to the stream portion information and the unique key. Triggered by the stream end signal, the playlist generator 330 transmits the playlist file to the playback file generator 332.

At step S1212, the playback file generator 332 generates a playback file with the playlist file and stream portions on streaming servers 372 and 374. The playlist file may include information of the streaming servers 372 and 374. The playback file generator 332 utilizes the unique key to access the correct stream portions stored respectively on the streaming servers 372 and 374, to generate the playback file. A transcoding process may be performed.

At step S1214, the playback file generator 332 uploads the playback file to the cloud server 380, and informs stakeholders of the URL for accessing the playback file.

In this embodiment, generation of the playback file happens only after the streaming is ended properly. It is guaranteed that the stakeholder can view the complete playback of the streaming file when being notified.

Figure 13:
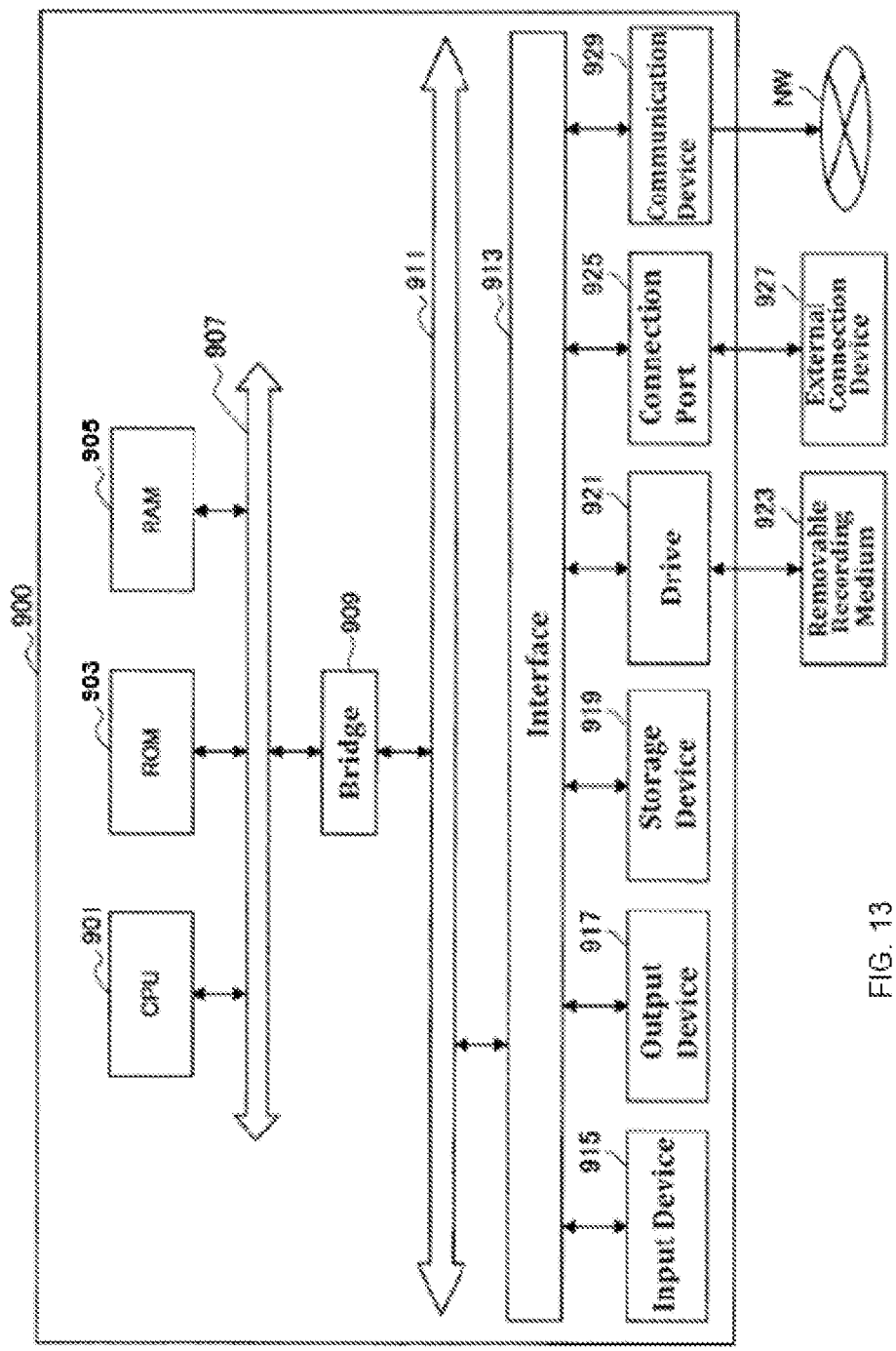
FIG. 13 is a block diagram showing an example of a hardware configuration of the information processing device according to some embodiments of the present disclosure.

Referring to FIG. 13, the hardware configuration of the information processing device will be now described. FIG. 13 is a block diagram showing an example of a hardware configuration of the information processing device according to some embodiments of the present disclosure. The illustrated information processing device 900 may, for example, realize the server 10 and/or the user terminals 20 and 30 in some embodiments.

The information processing device 900 includes a CPU 901, ROM (Read Only Memory) 903, and RAM (Random Access Memory) 905. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 903, the RAM 905, the storage device 919, or the removable recording medium 923. For example, the CPU 901 controls the overall operation of each functional unit included in the server 10 and the user terminals 20 and 30 in some embodiments. The ROM 903 stores programs, calculation parameters, and the like used by the CPU 901. The RAM 905 serves as a primary storage that stores a program used in the execution of the CPU 901, parameters that appropriately change in the execution, and the like. The CPU 901, ROM 903, and RAM 905 are interconnected to each other by a host bus 907 which may be an internal bus such as a CPU bus. Further, the host bus 907 is connected to an external bus 911 such as a PCI (Peripheral Component Interconnect/Interface) bus via a bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OLED, etc., a sound output device such as a speaker and headphones, and a printer. The output device 917 outputs the results of processing by the information processing unit 900 as text, video such as images, or sound such as audio.

The storage device 919 is a device for storing data configured as an example of a storage unit of the information processing equipment 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for a removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 905. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is an imaging element such as a CCD (Charge Coupled Device) or CMOS (Complementary Metal Oxide Semiconductor), and a device that captures an image of the real space using various elements such as lenses for controlling image formation of a subject on the imaging element to generate the captured image. The image capturing device may capture a still image or may capture a moving image.

The configuration and operation of the live streaming system 1 in the embodiment have been described. This embodiment is a mere example, and it is understood by those skilled in the art that various modifications are possible for each component and a combination of each process, and that such modifications are also within the scope of the present disclosure.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed, but includes another variation and modification that do not disobey the present disclosure, and is the scope covered by the patent application scope.

LIST OF REFERENCE NUMBERS 1 communication system
10 server
20 user terminal
30, 30a, 30b user terminal
LV distributor
AU1, AU2 viewer
VD, VD1, VD2 video image
NW network
30 user terminal
100 distribution unit
102 image capturing control unit
104 audio control unit
106 video transmission unit
108 distributor-side UI control unit
200 viewing unit
202 viewer-side UI control unit
204 superimposed information generation unit
206 input information transmission unit
302 distribution information providing unit
304 relay unit
306 gift processing unit
308 payment processing unit
310 stream DB
312 user DB
314 gift DB
330 playlist generator
332 playback file generator
350 playlist DB
352 playback file DB
362, 364, 372, 374 streaming server
380 cloud server 382, 384 cloud space
S700, S702, S704, S706, S708, S710, S712, S714 step
S800, S802, S804, S806, S808, S810, S812, S814, S816, S818, S820, S822, S824 step
S900, S902, S904, S906, S908, S910, S912, S914, S916, S918, S920, S922, S924, S926 step
S1100, S1102, S1104, S1106, S1108, S1110, S1112, S1114, S1116, S1118, S1120 step
S1200, S1202, S1204, S1206, S1208, S1210, S1212, S1214 step
900 information processing device
901 CPU
903 ROM
905 RAM
907 host bus
909 bridge
911 external bus
913 interface
915 input device
917 output device
919 storage device
921 drive
923 removable recording medium
925 connection port
927 external connection device
929 communication device

What is claimed is:

1. A method for playlist generation, executed by a playlist generator, comprising:
obtaining a first stream portion information and a unique key from a first streaming server;
determining a first set of stream portions stored on a space of a cloud server to be consistent with the first stream portion information, the space being addressable by the unique key;
generating a playlist file according to the first stream portion information;
obtaining a second stream portion information and the unique key from a second streaming server;
determining a second set of stream portions stored on the space of the cloud server to be consistent with the second stream portion information, wherein the first set of stream portions and the second set of stream portions belong to same stream file corresponding to the unique key; and
updating the playlist file from a bottom of a content of the playlist file according to the second stream portion information without replacing or overwriting the content of the playlist file, wherein the first set of stream portion is transmitted from a user terminal to the first streaming server for being transmitted to the cloud server before the user terminal suffers an Internet disconnection, and the second set of stream portion is transmitted from the user terminal to the second streaming server for being transmitted to the cloud server after the Internet disconnection recovers.

2. The method according to claim 1, further comprising: identifying the space on the cloud server with the unique key; and uploading the playlist file to the space.

3. The method according to claim 2, further comprising: transmitting an address capable of accessing the playlist file on the space.

4. The method according to claim 1, wherein the first streaming server transmits a first portion of the first set of stream portions to the space of the cloud server while generating a second portion of the first set of stream portions, wherein the first portion and the second portion are generated by the first streaming server according to the stream file received from a user terminal and corresponding to the unique key.

5. The method according to claim 4, wherein the first streaming server generates a first timestamp for the first portion and a second timestamp for the second portion, and the stream portion information includes a count of the first set of stream portions, the first timestamp and the second timestamp.

6. The method according to claim 1, wherein the first set of stream portions correspond to a first segment of the stream file of a distributor at a first timing, and the second set of stream portions correspond to a second segment of the stream file of the distributor at a second timing, wherein the stream file and the distributor are specified by the unique key.

7. The method according to claim 1, wherein the determining the first set of stream portions stored on the space of the cloud server to be consistent with the first stream portion information further comprises:
determining the first set of stream portions stored on the space of the cloud server to lack a portion according to the first stream portion information; and
waiting for the first streaming server to transmit the portion to the space of the cloud server, wherein generating the playlist file according to the first stream portion information is executed after determining the first set of stream portions stored on the space of the cloud server to be consistent with the first stream portion information.

8. A system for playlist generation, comprising one or a plurality of processors, wherein the one or plurality of processors execute a machine-readable instruction to perform:
obtaining a first stream portion information and a unique key from a first streaming server;
determining a first set of stream portions stored on a space of a cloud server to be consistent with the first stream portion information, the space being addressable by the unique key;
generating a playlist file according to the first stream portion information;
obtaining a second stream portion information and the unique key from a second streaming server; determining a second set of stream portions stored on the space of the cloud server to be consistent with the second stream portion information, wherein the first set of stream portions and the second set of stream portions belong to same stream file corresponding to the unique key; and
updating the playlist file from a bottom of a content of the playlist file according to the second stream portion information without replacing or overwriting the content of the playlist file, wherein the first set of stream portion is transmitted from a user terminal to the first streaming server for being transmitted to the cloud server before the user terminal suffers an Internet disconnection, and the second set of stream portion is transmitted from the user terminal to the second streaming server for being transmitted to the cloud server after the Internet disconnection recovers.

9. The system according to claim 8, wherein the one or plurality of processors execute the machine-readable instruction to further perform: identifying the space on the cloud server with the unique key; and uploading the playlist file to the space.

* * * * *